(12) United States Patent
Buttner (10) Patent No.: US 8,853,575 B2
(45) Date of Patent: Oct. 7, 2014

(54) SWITCHING APPARATUS (75) Inventor: Alex Buttner, Rödental (DE)

(73) Assignee: Wohner GmbH & Co. KG Elektrotechnische Systeme, Rodental (DE)

( * ) Notice: Subject to any disclaimer, the term of this patent is extended or adjusted under 35 U.S.C. 154(b) by 242 days.

(21) Appl. No.: 13/480,773

(22) Filed: May 25, 2012

(65) Prior Publication Data

US 2012/0298490 A1 Nov. 29, 2012

(30) Foreign Application Priority Data

May 26, 2011 (DE) .......................... 10 2011 076 550

(51) Int. Cl.
*H01H 9/02* (2006.01)
*H01H 13/14* (2006.01)
*H02B 1/052* (2006.01)

(52) U.S. Cl.
CPC ..................................... *H02B 1/052* (2013.01)
USPC .......................................... 200/303; 200/293

(58) Field of Classification Search
CPC ......... H01H 9/02; H01H 1/048; H01H 17/00; H01H 71/08; H01H 9/26; H01H 9/2608
USPC .......... 200/303, 293, 296, 295; 439/716, 532, 439/709
See application file for complete search history.

(56) References Cited

U.S. PATENT DOCUMENTS

| 5,888,881 | A | * | 3/1999 | Jeng et al. ...................... 438/425 |
| 6,224,429 | B1 | * | 5/2001 | Bernhards et al. ............ 439/709 |
| 6,293,820 | B1 | * | 9/2001 | Bechaz et al. ................. 439/532 |
| 7,403,373 | B2 | * | 7/2008 | McCoy et al. ................. 361/673 |
| 7,540,790 | B2 | * | 6/2009 | Weber et al. ................... 439/716 |
| 2008/0169175 | A1 | * | 7/2008 | Weber et al. ................... 200/295 |

FOREIGN PATENT DOCUMENTS

| DE | 202004011736 U1 | 11/2004 |
| DE | 20 2004 019 381 U1 | 2/2005 |
| DE | 10 2004 062 524 A1 | 7/2006 |
| DE | 10 2006 030 953 A1 | 3/2007 |
| DE | 102006004621 B3 | 7/2007 |

OTHER PUBLICATIONS

German Office Action for German Patent Application No. 10 2011 076 550.6, dated Aug. 22, 2012, 10 pages.
German Search Report for German Patent Application No. 10 2011 076 550.6, dated Mar. 27, 2012, 8 pages.
Extended European Search Report for EP 12168504.4-1801/2528178, dated Apr. 4, 2014, 6 pages.

* cited by examiner

*Primary Examiner* — Kyung Lee
(74) *Attorney, Agent, or Firm* — Westman, Champlin & Koehler, P.A.

(57) ABSTRACT

A switching apparatus for fastening to carrier rails in switching systems or the like, has a housing in which a switching unit and a device, which is formed on the underside of the housing, for attaching and locking onto a carrier rail. The device comprises a cut-out adapted to the profile of the carrier rail and is provided with an element which can be displaced with respect to the cut-out and is disposed in an aperture of the housing. The displaceable element is a tongue integrally formed on the underside of the housing by means of at least two ribs. The ribs extend in parallel with one another and are integrally formed at one end on the housing, whereas the tongue is integrally formed at the other end of the ribs.

13 Claims, 8 Drawing Sheets

SWITCHING APPARATUS

CROSS-REFERENCE TO RELATED APPLICATION

This Application claim the benefit of German Patent Application No. 10 2011 076 550.6, filed May 26, 2011, the contents of which are hereby incorporated by reference in their entirety.

The invention relates to a switching apparatus for attachment to carrier rails in switching systems or the like.

In switching systems, carrier rails serve to fasten switching apparatuses, e.g. switching devices or fuse switches. The carrier rails are typically fixedly mounted in the switching system or, in accordance with DE 20 2004 011 736 U1, are fastened to adapters which for their part can be attached to bus bars. The carrier rails can be configured in a variety of ways, but preferably have two guide limbs which are mutually spaced apart and point away from one another and to which the relevant switching apparatuses are attached and locked by means of cut-outs formed on their underside.

A known switching apparatus, e.g. Wöhner type AES1P/N, Part no. 31273, is provided on its underside with a cut-out which is formed in the shape of a hook on one side for attaching to a limb of a carrier rail, and which is equipped on the other side with an adjustable slide which, after attachment of the switching apparatus, automatically engages by spring pressure underneath the other limb of the carrier rail and in this way ensures that the switching apparatus is fixedly secured to the respective carrier rail. In this case, the slide is adjustable in the direction of the longitudinal axis of the switching apparatus, i.e., transversely with respect to the axis of the carrier rail, and is adjustably guided by means of bent limbs formed on the underside of the switching apparatus. In order to unlock the switching apparatus, the slide has to be moved away from the carrier rail by means of a tool, after which the switching apparatus can then be lifted from the carrier rail A disadvantage of switching apparatuses of this type is that during production individual parts are to be produced by an additional moulding machine in order to form the aforementioned slide, and that after injection-moulding of the housing of the switching apparatus the slide must be inserted into the guide receptacle provided accordingly at that location. In this case, this guide receptacle with the slide has the function of a locking device for locking the switching apparatus with respect to the carrier rail.

Switching apparatuses of this type can be of a single-pole or multi-pole configuration or can be composed from single-pole units to form multi-pole units, wherein each individual switching apparatus is equipped with this type of slide.

The object of the present invention is to provide a switching apparatus which comprises a locking device, wherein the entire construction of the switching device is simplified and contributes significantly to the reduction in production costs.

In the case of a switching apparatus for fastening to carrier rails in switching systems or the like, having a housing, in which there are provided a switching unit and a device, which is formed on the underside of the housing, for attaching and locking onto the carrier rail, wherein the device comprises a cut-out adapted to the profile of the carrier rail and is provided with an element which can be displaced with respect to the cut-out and is disposed in an aperture of the housing, this object is achieved in accordance with the invention by virtue of the fact that the displaceable element is a tongue which is integrally formed on the underside of the housing by means of at least two ribs, wherein the ribs extend in parallel with one another and are integrally formed at one end on the housing, whereas the tongue is integrally formed at the other end of the ribs, that the tongue comprises a hook-shaped locking portion at one end protruding over the ribs and pointing in the direction of the cut-out, and comprises a latching portion and an actuating portion at the other end.

Further embodiments of the switching apparatus in accordance with the invention are apparent from the subordinate claims.

A preferred embodiment of the switching apparatus in accordance with the invention is described hereinafter for explanation of further features. In the drawing.

A preferred embodiment of the switching apparatus, preferably in the form of a fuse switch, is explained in greater detail hereinafter. The switching apparatus in accordance with the invention comprises a housing 1 which, in the illustrated embodiment, consists of two shell halves 1a, 1b which together define a space in which a switching unit is disposed. Located on the upper side of the housing 1 is an actuating switch 2 which acts upon the switching unit or is acted upon by the switching unit.

Figure 3:
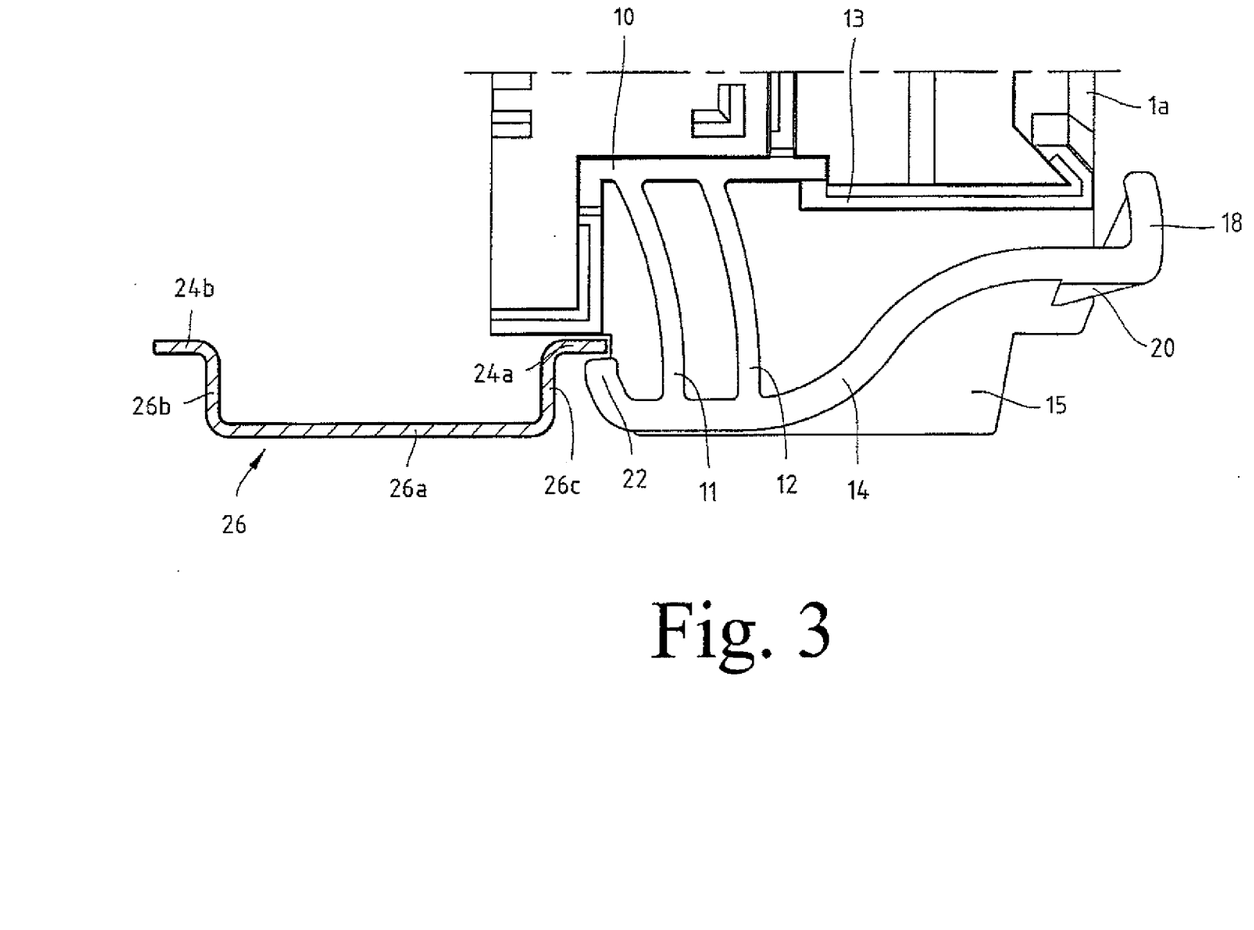
FIG. 3 shows a view of a housing shell half of the switching apparatus corresponding to the view in FIG. 1.
Figure 4:
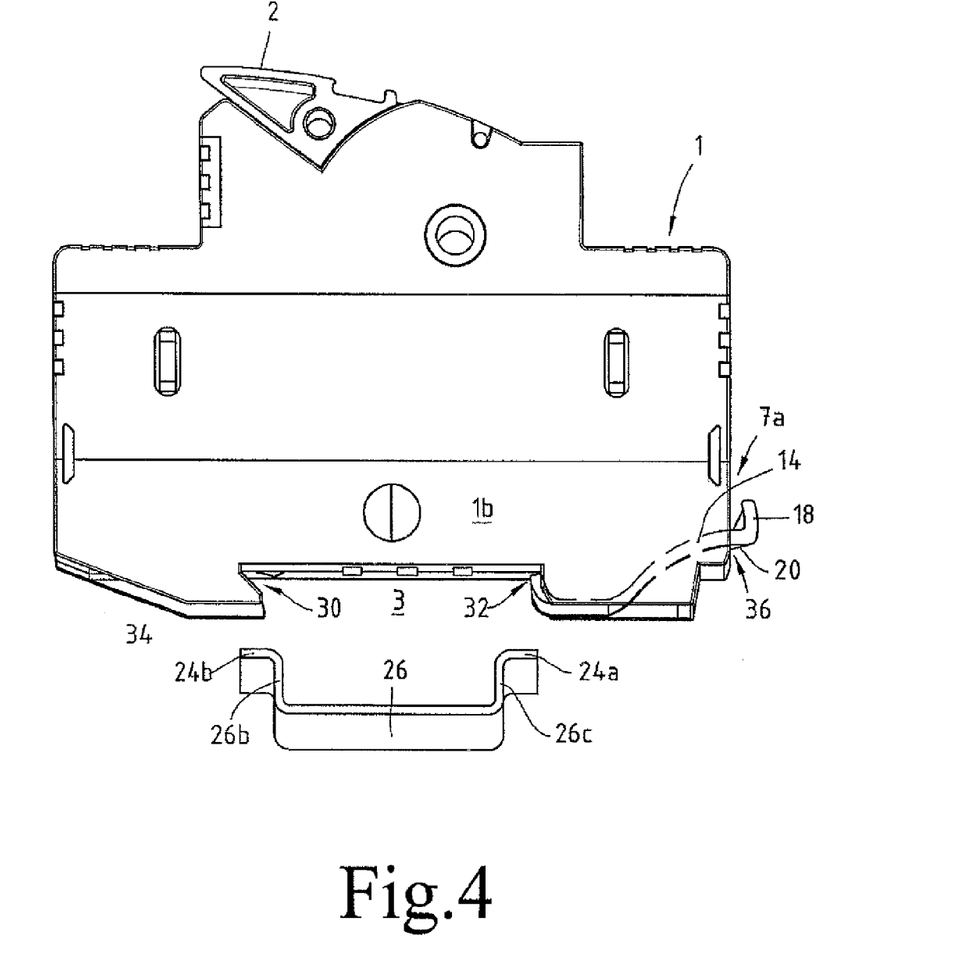
FIG. 4 shows a perspective view of the switching apparatus to exemplify the cut-out and the associated carrier rail on the underside thereof.

The housing 1 comprises on its underside a cut-out 3 which in terms of the lateral view has a typical configuration and serves to facilitate attachment of the switching apparatus to a carrier rail 6 which is to be explained in greater detail in conjunction with FIGS. 3 and 4. Located on the end side 7a of the switching apparatus is an actuating portion 8 which will be explained in detail hereinafter in conjunction with a device for locking the switching apparatus on the associated carrier rail.

Figure 1:
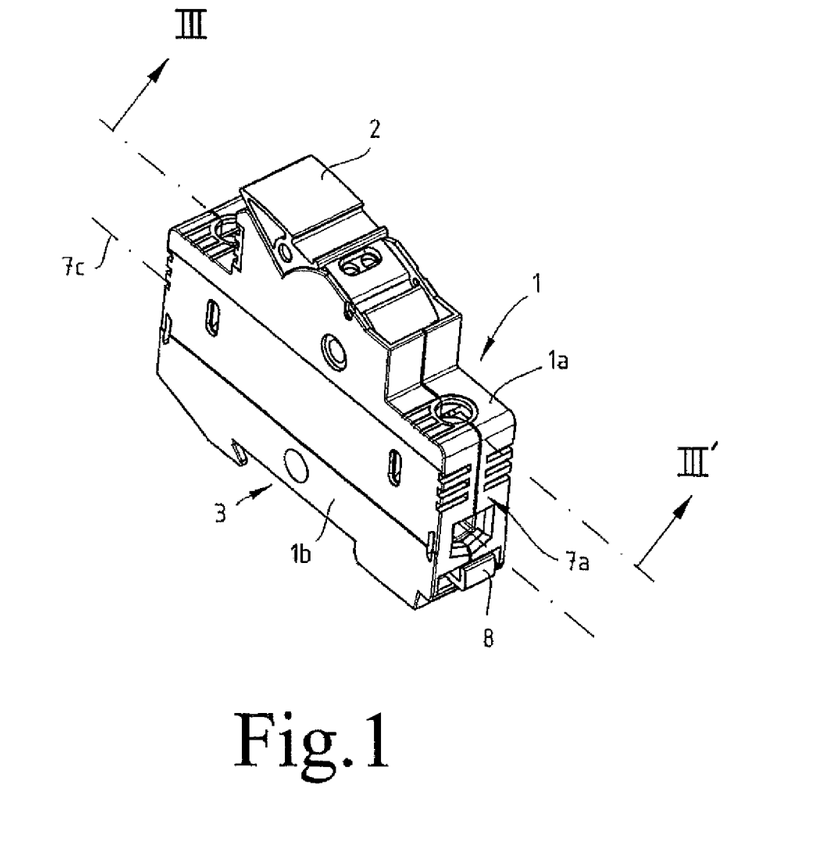
FIG. 1 shows a perspective view of a single-pole switching apparatus, preferably in the form of a fuse switch.
Figure 2:
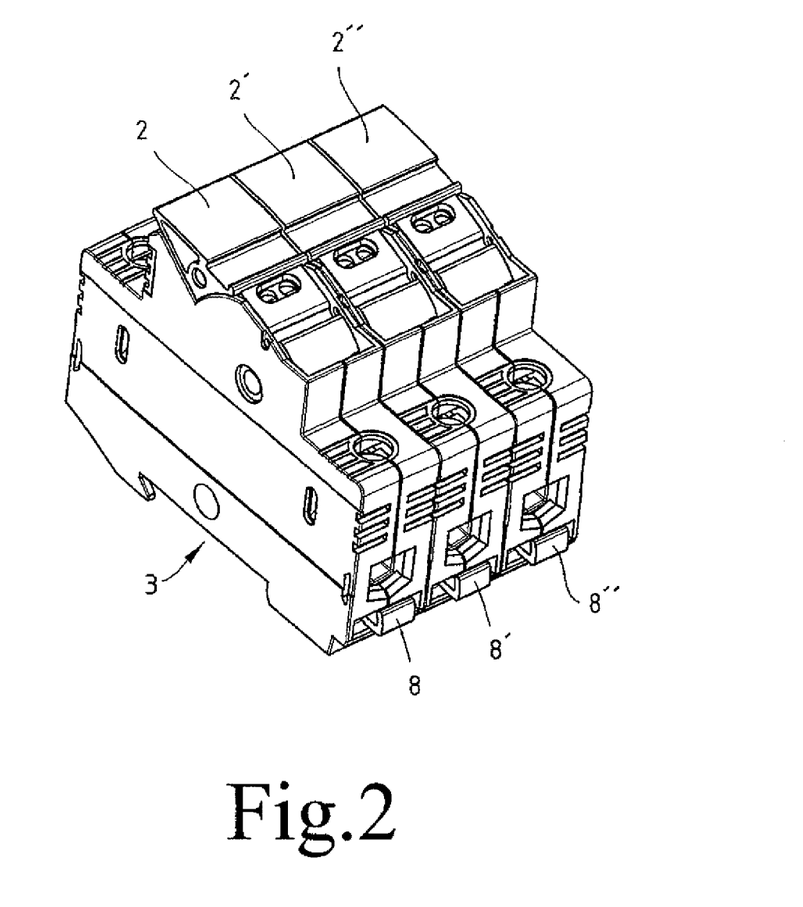
FIG. 2 shows an illustration, corresponding to FIG. 1, of a three-pole switching apparatus.

FIG. 2 shows an illustration, corresponding to FIG. 1, of a three-pole switching apparatus which is composed of a total of three switching apparatuses of the type illustrated in FIG. 1 and is connected to form a module. In the case of a three-pole switching apparatus, preferably each individual switching apparatus comprises in each case a locking device so as overall to be able to ensure secure fastening of the three-pole switching apparatus with respect to the associated carrier rail. The actuating portions are designated in FIG. 2 by the reference numerals 8, 8' and 8".

Figure 5:
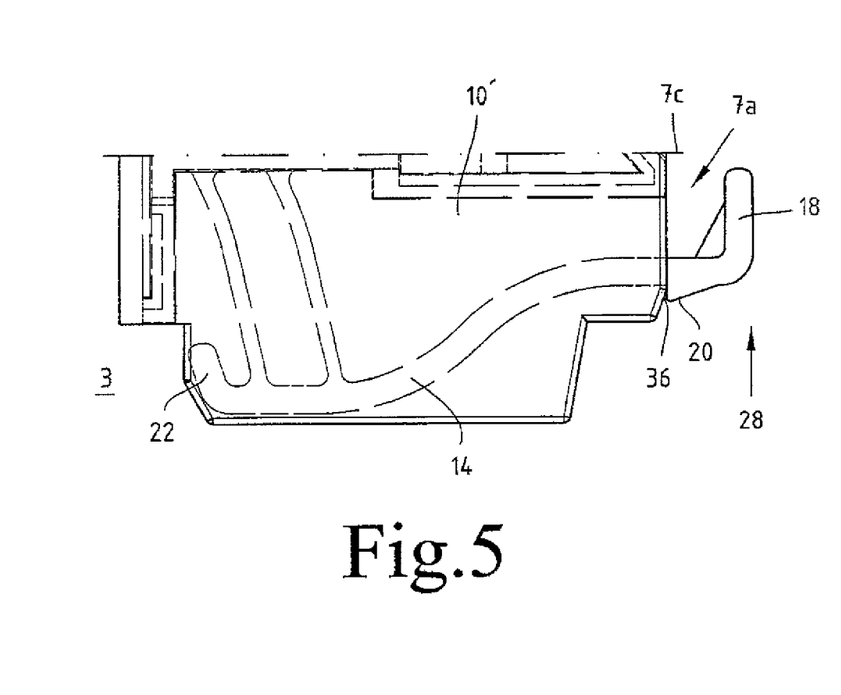
FIG. 5 shows a view of the other housing half of the switching apparatus.

Whereas in the case of the Prior Art the locking device consists of a slide which is mounted on the underside of the housing 1 of the switching apparatus so as to be adjustable along a guide device, the switching apparatus in accordance with the invention comprises a locking device which forms an integral part of the switching apparatus. In accordance with the preferred embodiment of the invention as illustrated in FIG. 3, the locking device is integrally formed on the housing 1, preferably on the housing shell half 1a. For this purpose, the shell half 1a is provided with a web 10 formed in the longitudinal axis direction 7c of the housing 1. The web 10 extends in parallel with the longitudinal axis of the housing 1 on the shell half 1a, and moreover in proximity to the lower edge or the base of the housing 1 over a predetermined length. Integrally formed on the web 10 are downwardly strutting ribs 11, 12, on whose end remote from the web 10 a preferably curved tongue 14 is integrally formed, as clearly seen in FIG. 3. In the case of the illustrated embodiment, preferably two mutually parallel-extending ribs 11, 12 are provided which impinge approximately perpendicularly upon the tongue 14, wherein the thickness of the ribs 11, 12 and of the tongue 14 is selected such that the tongue 14 has a predetermined resilient or elastic property and the tongue 14 can be adjusted within an aperture, designated by the reference numeral 15, on the underside of the housing 1 between the housing shell halves 1a, 1b. The tongue 14 is integrally formed on the lower, as seen in FIG. 1, end of the ribs 11, 12, or forms an integral part with the ribs 11, 12 and the web 10, from which the ribs run away. The web 10 and also the ribs 11, 12 and the tongue 14 are preferably integrally formed on the housing shell half 1a, as will be described hereinafter. As shown in FIGS. 3 and 5, the housing shell halves 1a, 1b are formed in a complementary or at least substantially complementary manner with respect to one another.

The web 10 of the housing shell half 1a has a complementary web 10' in the housing shell half 1b, wherein the height of these webs 10, 10' is equal to or slightly lower than the clearance between the housing shell halves 1a, 1b. In the case of the illustrated embodiment, the web 10 has a greater height and thus extends at least partially into the housing shell half 1b. The sum of the webs 10, 10' is thus at most equal to the clearance between the housing shell halves 1a, 1b.

In the case of the illustrated embodiment, the web 10 protrudes from the housing shell half 1a over the width or depth which is approximately the width of a housing half or is somewhat greater than the width of a housing half, wherein in the latter case the web extends into the second housing half 1b. In accordance with FIG. 3, the web 10 is adjoined by a further web 13 which extends in the direction of the end side 7a of the housing on the right-hand side in FIG. 3 and which in the illustrated embodiment has a smaller width than the web 10. The web 10 and also the web 13 are allocated correspondingly complementary webs 10', 13' in the opposite housing shell half 1b, so as to effect mutual support between the respective webs 10, 10' and 13, 13' as soon as the housing shell halves 1a, 1b are joined together. The ribs 11, 12 have a smaller width than the web 10, 10', so that they can be freely displaced with respect to the outer sides of the housing shell halves 1a, 1b, i.e., the ribs 11, 12 and also the tongue 14 maintain with respect to the wall of the housing shell halves 1a, 1b an air gap, thus ensuring mobility of the ribs 11, 12 and the tongue 14 with respect to the housing shell halves 1a, 1b.

FIG. 3 schematically shows the state, in which the housing is attached to a carrier rail 26. The attachment of the housing 1 to the carrier rail will be explained in more detail hereinafter.

In accordance with FIGS. 3 and 4, the tongue 14 is provided on its outwardly located end with an actuating portion 18 which is formed in the shape of a hook and is bent towards the upper side of the housing. Furthermore, the actuating portion 18 has a latching portion 20 formed thereon which is placed below the upwardly bent actuating portion 18 and functions as a latching means with respect to an associated housing part. The end of the tongue 14 opposite the actuating portion 18 is bent upwards in the shape of a hook and serves as a locking portion 22 to lock the switching apparatus with respect to a limb 24 of a carrier rail 26. It is apparent from FIG. 3 that in terms of its level the locking portion 22 is located at a lower position than the actuating portion 18. The reason for this is that the carrier rail 26 can be mounted directly on a mounting wall or the like and therefore a free movement of the actuating portion 18 can be guaranteed by the fact that the actuating portion 18 is located at a predetermined distance from the mounting plate. The locking portion 22 is bent slightly upwards and furthermore to the extent that it can engage underneath a limb 24a of the carrier rail 26 when the housing 1 is attached to the carrier rail 26. The locking portion 22 is located in very close proximity to the housing base, i.e., in the region of the receptacle of the carrier rail 26 and thus at a level below the actuating portion 18 and, after the switching apparatus has been attached to the associated carrier rail 22, should be able to engage securely underneath a limb 24 of the carrier rail 26 after corresponding actuation as shown in FIG. 3. If the housing 1 is to be removed or detached from the associated carrier rail 26, the actuating portion 18 is to be displaced in FIG. 3 to the right for disengagement of the locking arrangement, in order to displace the locking portion 22 in FIG. 3 likewise to the right, so that disengagement from the carrier rail 26 can be achieved. In the state not attached to the carrier rail 26, i.e., prior to mounting of the switching apparatus, the tongue 14 is located in a position which is shown in FIG. 5, i.e., the locking portion 22 is located outside the cut-out designated in FIG. 4 by the reference numeral 3, therefore in the interior of the housing shell halves 1a, 1b, as illustrated in FIG. 5. The actuating portion 18 lies with its latching portion 20 in a locking manner on an end-side wall of the housing 1 and thus holds the locking portion 22 in the position shown in FIG. 5. Raising the actuating portion 18, preferably in the direction of the arrow 28 in FIG. 5 permits a displacement of the tongue 14 to the left in FIG. 5 in the direction of the cut-out 3 for the purpose of locking with respect to a carrier rail 26. A prerequisite for this is that the ribs 11, 12 have a certain degree of spring elasticity and permit displacement of the tongue 14 from the position shown in FIG. 5 to the position shown in FIG. 3. The latching portion 20 is formed on the underside of the actuating lever 18 in the form of a projecting tongue or rib and, when the actuating portion 18 is locked, is engaged with a wall portion of the end side 7a. In order to displace the tongue 14, the ribs 11, 12 are integrally formed on the web 10 such that they are subjected to a certain pretensioning and, after release of the actuating lever 18 from the locking position shown in FIG. 5, move the portion 22 of the tongue 14 from the housing portion and from the position shown in FIG. 5.

To better illustrate the aperture 3, a partial perspective view is provided in FIG. 4 which illustrates the shell half 1b and the shell half 1a located behind it, and the cut-out 3 which is defined by an approximately hook-shaped engaging portion 30 on the side illustrated on the left in FIG. 4 on the one hand and by a partially straight and bent guiding portion 32. In the case of the illustrated embodiment of the switching apparatus, the cut-out 3 is constituted by a corresponding extension of the housing walls of the housing shell halves 1a, 1b, wherein the engaging portion 30 and the guiding portion 32 can be formed as moulded parts protruding on the housing shell halves 1a, 1b and thus protrude with respect to a housing base designated by the reference number 34 (FIG. 4).

In the case of a preferred embodiment, the latching portion 20 is provided as a latching lug formed on the underside of the tongue 14, wherein the tongue 14 is pretensioned such that in the position illustrated in FIG. 5 the latching lug 20 automatically engages over a housing wall or housing edge 36 formed on the end side of the housing. The pretensioning required for this purpose is produced by the length of the ribs 11, 12. In order to increase this pretensioning, the length of the rib 12 can be greater than the length of the rib 11.

In the case of the illustrated embodiment, as shown in FIGS. 3 and 5 two mutually parallel-extending ribs 11, 12 are provided; where required, the number of these ribs can be changed, in particular increased. The tongue 14 itself has an approximately S-shaped form and comprises at both of its ends the above-described actuating portion 18 and the locking portion 22 which are both pulled from the bottom upwards (see FIGS. 3 and 4) in the direction of the upper side of the housing. In the case of the illustrated, preferred embodiment it is essential that the ribs 11, 12 along with the tongue 14 and the housing edge 36, which extends transversely with respect to the longitudinal axis of the housing, are formed on the housing shell half 1a and the aforementioned components constitute integrated parts of the housing shell half 1a, which substantially simplifies the production of the switching apparatus in accordance with the invention.

Figure 6:
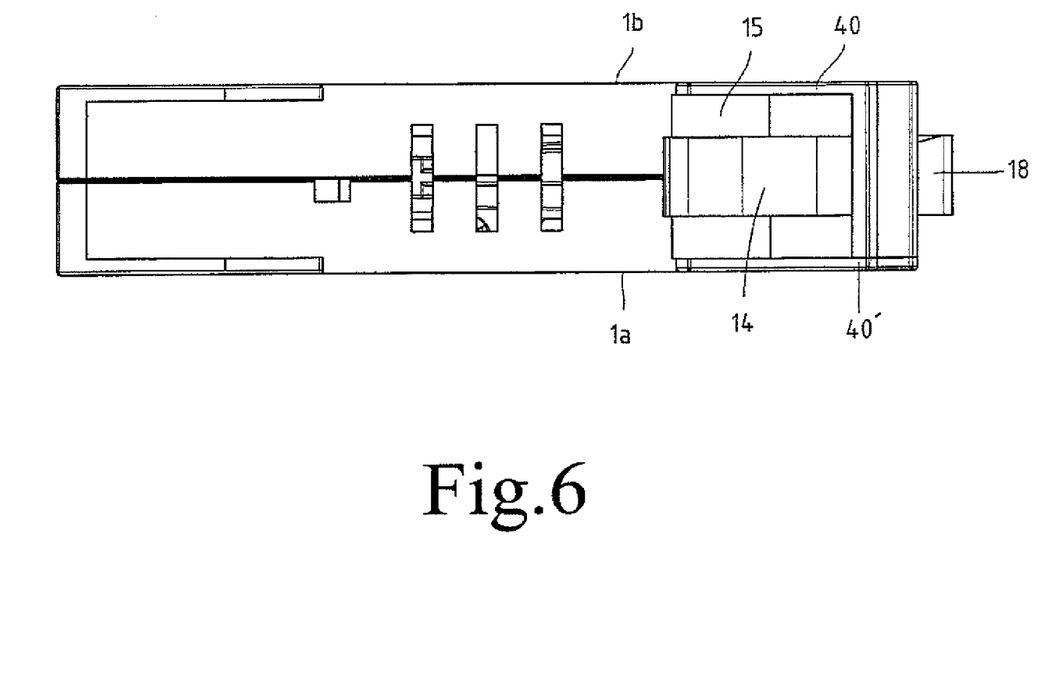
FIG. 6 shows a bottom view of the switching apparatus in accordance with the invention.

FIG. 6 shows a view of the switching apparatus from below and illustrates that the aperture 15 is defined by an approximately U-shaped web 40, wherein the web 40 closes off the aperture 15 towards the end side of the housing. It is also apparent from FIG. 6 that the tongue 14 is located inside the opening defined by the web 40 and therefore is basically freely accessible from below. However, this opening which is formed by the U-shaped web 40 can also be closed by a wall, if desired. In this case, sections of the web 40 are formed on the shell half 1a and the shell half 1b and in this embodiment is defined by a separation point 40' on the shell half 1a.

In the case of the illustrated embodiment as shown in FIGS. 3 and 4, the carrier rail 26 has a substantially U-shaped progression, but can be formed in particular in the manner described in DE 20 2004 011 736 U. Carrier rails 26 of this type are also defined as top hat rails and are supplied e.g. with a width of 35 mm. The preferred top hat rail illustrated in FIG. 3 thus consists of a base 26a and substantially mutually parallel limbs 26b, 26c which strut laterally upwards therefrom (FIG. 3) and whose upper ends are provided with laterally and outwardly bent flanges 24a, 24b which are encompassed by the switching apparatus when the housing 1 is in the state when mounted on the carrier rail 26.

The inventive switching apparatus having a locking device is produced preferably from synthetic material, preferably polyamide and permits simple assembly and disassembly with respect to the associated carrier rails. A preferred embodiment of the switching apparatus is a fuse switch in which a respective fuse is accommodated in the housing, said switch 2 serving to activate or initiate said fuse.

After the two housing shell halves 1a, 1b have been injection-moulded and removed from the mould, the two housing shells are fixedly connected together by means of ultrasonic welding. The formation of the housing shell halves 1a, 1b together with the tongue 14 integrally formed on one of the two housing shell halves 1a allows the parts to be easily removed from the mould before they are joined together and subjected to ultrasonic welding.

It is apparent from the description above that the tongue 14 is provided with the locking portion 22 on its end protruding with respect to the ribs 11, 12, and is provided with the actuating portion 18 and the latching portion 20 on the opposite end, wherein the latching portion 20 and the actuating portion 18 are provided at a level situated above the level of the locking portion 22. The ribs 11, 12 and/or the tongue 14 are of such a thickness as to ensure a predetermined spring elasticity. The thickness of the ribs 11, 12 and/or the tongue 14 is preferably less than 4 mm, preferably less than 3 or 2 mm. As evident in FIG. 3, the length of the aperture 15 is somewhat shorter than the length of the tongue 14 between the locking portion 22 and the actuating portion 18, thus ensuring that the actuating portion 18 definitely protrudes from the housing when the locking portion 22 is located in the position illustrated in FIG. 5. As shown in FIG. 4, the switching apparatus is initially attached so that the switching apparatus—tilted anticlockwise—is attached with the pointed engaging portions 30 initially to the flange 24b of the carrier rail 26, is then pivoted in a clockwise direction and attached to the other flange 24a of the carrier rail 26 by means of the guiding portions 32, after which the actuating portion 18 is then released from the position illustrated in FIG. 5, e.g. is unlocked by being raised, so that subsequently the locking portion 22 engages underneath the limb of the carrier rail 26 on the right in FIG. 4.

Figure 7:
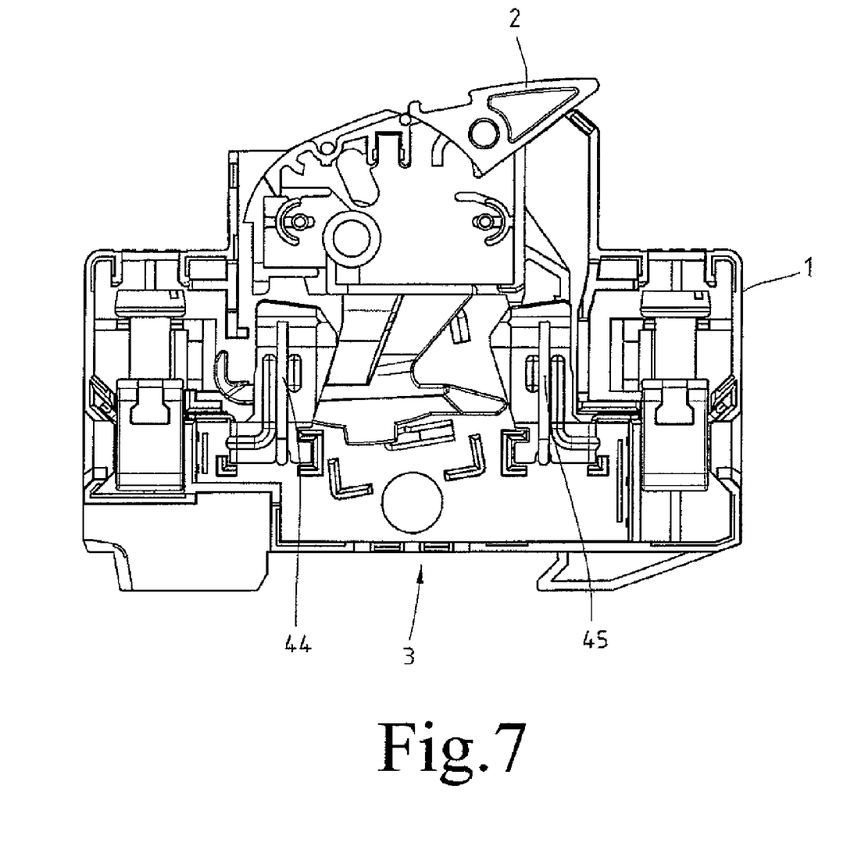
FIG. 7 shows an illustration of a preferred switching apparatus in the form of a fuse switch.

FIG. 7 shows a preferred embodiment of an inventive switching apparatus as a fuse switch. The switching apparatus comprises an actuating switch, designated by the reference numeral 2, and also contains contacts 44, 45. Located in the interior of the switching apparatus are components, not described further, which are used to introduce a fuse between the contacts 44, 45. Alternatively, the fuse can be moved between the contacts 44, 45 by hand. Finally, in order to put the fuse holder into operation the actuating switch 2 is to be displaced to the position designated in FIG. 7, in which the fuse between the contact portions 44, 45 is put into operation or energised. Located on the underside of the fuse switch is the above-described cut-out 3 for fastening the fuse switch to a carrier rail 26. As mentioned, the inventive formation of the locking tongue 14 can also be used in other switching devices.

Figure 8:
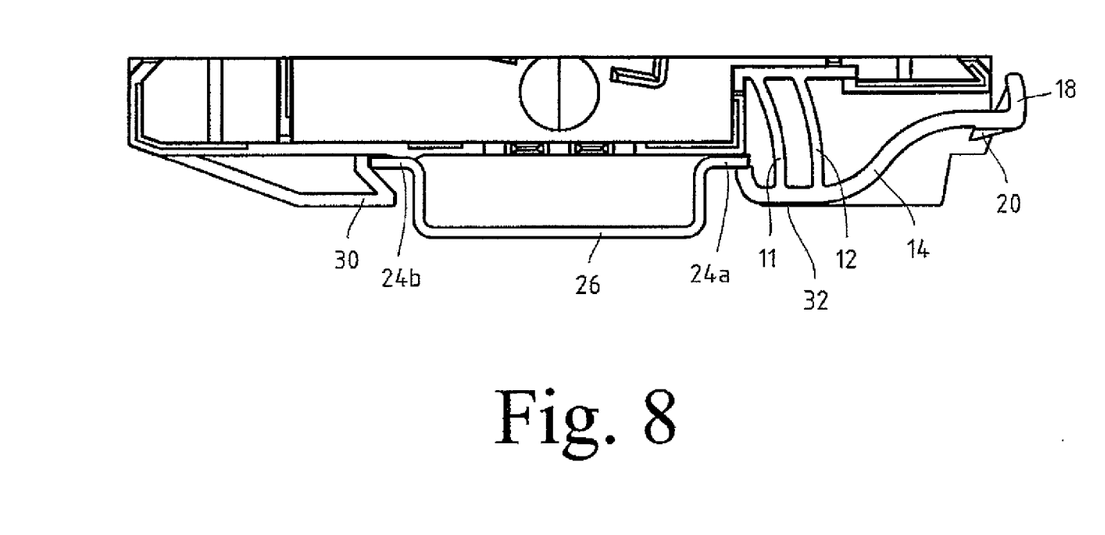
FIG. 8 shows a partially sectional illustration of the switching apparatus to illustrate the fastening of the switching apparatus to a carrier rail.

FIG. 8 shows the switching apparatus in the state when attached to the carrier rail 26, in which the tongue 14 engages underneath the flange 24a, whereas the flange 24b of the carrier rail 26 extends into the engaging portion 30. Therefore, the switching apparatus is firmly seated on the carrier rail 26 and can thus be released therefrom by displacement of the actuating portion 18 outwards, i.e., to the right with respect to the housing 1, in FIG. 8 using a tool, whereby the flange 24a is released.

Details of a switching apparatus which can be used by way of example are described for example in DE 10 2006 004 621, FIG. 2.

The invention claimed is:

1. Switching apparatus for fastening to carrier rails in switching systems or the like, having a housing in which there are provided a switching unit and a device, which is formed on the underside of the housing, for attaching and locking onto a carrier rail, wherein the device comprises a cut-out adapted to the profile of the carrier rail and is provided with an element which can be displaced with respect to the cut-out and is disposed in an aperture of the housing, characterized in that the displaceable element is a tongue which is integrally formed on the underside of the housing by means of at least two ribs, wherein the ribs extend in parallel with one another and are integrally formed at one end on the housing, whereas the tongue is integrally formed at the other end of the ribs, that the tongue comprises a hook-shaped locking portion at one end protruding over the ribs and pointing in the direction of the cut-out, and comprises a latching portion and an actuating portion at the other end, wherein the aperture constitutes an opening which is surrounded by a U-shaped web of the walls of the housing.

2. Switching apparatus as claimed in claim 1,
characterized in that the ribs and/or the tongue have a resilient property.

3. Switching apparatus as claimed in claim 1,
characterized in that the ribs and/or the tongue have a thickness of less than 4 mm, preferably less than 3 mm or 2 mm.

4. Switching apparatus as claimed in claim 1,
characterized in that the tongue is bent, preferably in an S-shape, and the locking portion is disposed in proximity to the base of the housing, whereas the actuating portion of the tongue is disposed at a level above the locking portion and protrudes from the housing at least when the switching device is not locked with respect to the carrier rail.

5. Switching apparatus as claimed in claim 1, wherein the housing consists of two housing shell halves,
characterized in that the ribs and the tongue are integrally formed on a first one of the housing shell halves.

6. Switching apparatus as claimed in claim 5,
characterized in that the first housing shell half comprises a web, on which the ribs are integrally formed.

7. Switching apparatus as claimed in claim 5,
characterized in that the second housing shell half which is complementary to the first housing shell half comprises a web which is flush or aligned with the web of the first housing shell half, wherein the two webs constitute the upper side of the aperture, and the webs are positioned in abutment with one another when the housing halves are assembled.

8. Switching apparatus as claimed in claim 1,
characterized in that the tongue is mounted centrally in the aperture.

9. Switching apparatus as claimed in claim 1, characterized in that the latching portion of the tongue is formed by means of a latching lug which can be brought into engagement with an end-side edge of the housing, in order to hold the locking portion in a released position.

10. Switching apparatus as claimed in claim 1, characterized in that the housing shell halves comprise walls which in the region of the housing base constitute a cut-out corresponding to the profile of a carrier rail.

11. Switching apparatus as claimed in claim 1, characterized in that the tongue comprises an approximately S-shaped progression having hook-shaped portions which are located at both ends and which are bent in the direction towards the upper side of the housing.

12. Switching apparatus as claimed in claim 1, characterized in that the tongue has a length approximately equal to the axial length of the aperture.

13. Switching apparatus as claimed in claim 1, characterized in that it the switching apparatus is formed as a fuse switch.

* * * * *